L. B. Walker,

Planing Wood.

No. 100,695. Patented Mar. 8, 1870.

Witnesses:

Inventor.
Loadus B. Walker.
per Alexander & Mason
Attys.

United States Patent Office.

LOUDUS B. WALKER, OF CHICAGO, ILLINOIS.

Letters Patent No. 100,695, dated March 8, 1870.

IMPROVEMENT IN PLANING-MACHINES.

The Schedule referred to in these Letters Patent and making part of the same.

*To all whom it may concern:*

Be it known that I, LOUDUS B. WALKER, of Chicago, in the county of Cook, and State of Illinois, have invented certain new and useful Improvements in Planing and Tongue and Grooving-Machines; and do hereby declare the following to be a full, clear, and exact description thereof, reference being had to the accompanying drawings and to the letters of reference marked thereon, forming part of this specification.

My invention relates to certain improvements connected with or on the adjustable table of a planing and tongue-and-grooving machine; and It consists, first, in providing the feed-table with four rollers or wheels, to rest upon four inclines; second, in moving the four inclines all at one time, with one screw, for raising and lowering the table to any desired distance from the cylinder; and, third, in the arrangement of adjustable boxes, set-screws, and rollers, that carry the inclines by means of the set-screws under each box, to raise or lower either side of the table to an exact line with the cutting-edge of the knives of the cylinder.

In order to enable others skilled in the art to which my invention appertains to make and use the same, I will now proceed to describe its construction and operation, referring to the annexed drawings, in which—

Figure 1:
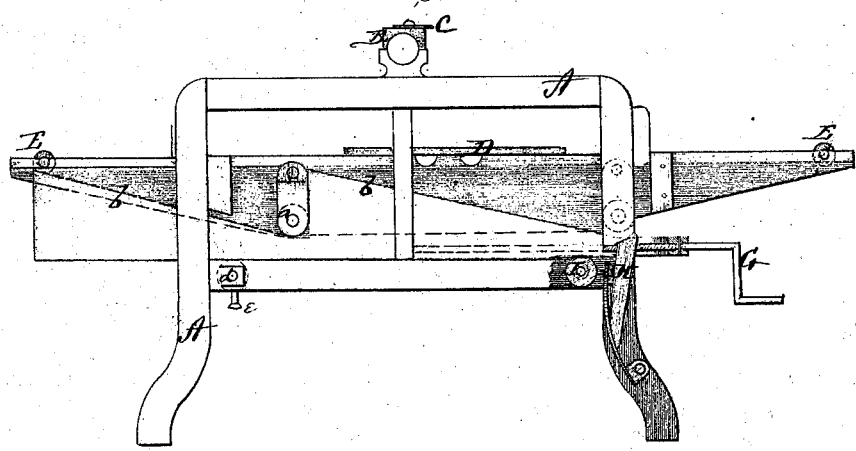

Figure 1 is a side elevation, and

Figure 2:
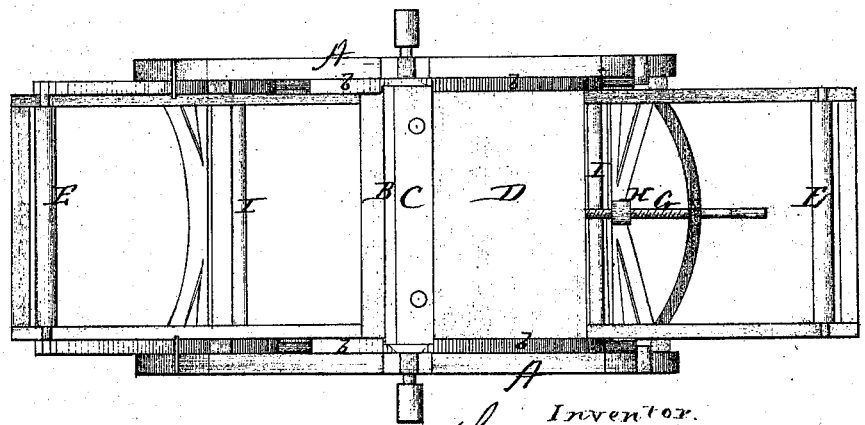

Figure 2, a plan view of my machine.

A represents the frame of my machine, across the upper portion of which is placed the cylinder B, carrying the knives C C.

Below the cylinder B in the frame A is placed the feed-table D, having at each end a roller, E, carrying endless chains, &c., for feeding the material to the knives.

On each side of the table D are placed two rollers or wheels, $a\ a$, each of which rests upon an incline, $b$.

The four inclines $b\ b$ are all connected so as to form one frame, which is moved endwise by means of a screw, G, said screw passing through the front end of the frame formed by the inclines, and through a standard, H, in the frame A.

By turning the screw G the incline frame is moved endwise in either direction, and as the table D is so constructed that it cannot move endwise in the frame A, it follows that it will gradually rise or fall according to the direction in which the inclines are moved.

The rollers or wheels $a\ a$ allow the table D to move on the inclines, or rather the inclines to move under the table, without any perceptible amount of friction, and consequently the table can readily be adjusted at any distance from the edges of the cutting-knives C C.

The frame formed of the four inclines $b\ b$ rests upon two rollers, I I, having their bearings in adjustable journal-boxes, $d\ d$, in the frame A.

These journal-boxes are raised and lowered by means of the set-screws $e\ e$, from underneath, so that either side of the table may be raised or lowered at will to bring it in an exact line with the cutting-edges of the knives on the cylinder.

Having thus fully described my invention,

What I claim as new, and desire to secure by Letters Patent, is—

The combination of the table D, rollers $a\ a$, inclines $b\ b$, screw G, rollers I I, journal-boxes $d\ d$, and set-screws $e\ e$, all constructed and arranged as described, to operate substantially in the manner and for the purposes herein set forth.

In testimony that I claim the foregoing, I have hereunto set my hand this first day of October, 1869.

LOUDUS B. WALKER.

Witnesses:
  A. H. WAGNER,
  M. E. MORRISON.